(12) United States Patent
Fusselman et al.

(10) Patent No.: US 7,972,572 B2
(45) Date of Patent: Jul. 5, 2011

(54) REACTOR VESSEL AND LINER

(75) Inventors: Steven P. Fusselman, Simi Valley, CA (US); Stephen Arthur Yows, Moorpark, CA (US); Bryan William McEnerney, Woodland Hills, CA (US); Kenneth M. Sprouse, Northridge, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 684 days.

(21) Appl. No.: 12/041,742

(22) Filed: Mar. 4, 2008

(65) Prior Publication Data

US 2009/0226350 A1 Sep. 10, 2009

(51) Int. Cl.
  *B01J 19/00* (2006.01)
  *F28D 7/00* (2006.01)
  *F27D 1/12* (2006.01)
  *F23M 5/00* (2006.01)

(52) U.S. Cl. ........ 422/241; 422/129; 422/198; 422/200; 422/201; 422/202; 422/203; 432/233; 110/336

(58) Field of Classification Search .................. 422/241, 422/200–203, 198, 129, 211; 432/233; 110/336; 48/210; 60/772, 753
See application file for complete search history.

(56) References Cited

U.S. PATENT DOCUMENTS

| | | | |
|---|---|---|---|
| 254,433 A | 2/1882 | Didier | |
| 257,571 A | 5/1882 | Gordon | |
| 2,827,279 A | 3/1958 | Cox | |
| 2,987,788 A | 6/1961 | Lyman | |
| 3,918,255 A | 11/1975 | Holden | |
| 4,188,915 A | 2/1980 | Danguillier et al. | |
| 4,443,188 A * | 4/1984 | Buhler | 432/233 |
| 4,838,030 A | 6/1989 | Cramer | |
| 4,869,207 A | 9/1989 | Engstrom | |
| 5,248,483 A | 9/1993 | Carter | |
| 6,418,973 B1 | 7/2002 | Cox | |
| 6,758,386 B2 | 7/2004 | Marshall | |
| 6,920,836 B2 | 7/2005 | Sprouse | |
| 6,982,506 B1 | 1/2006 | Johnsen | |
| 7,037,473 B1 | 5/2006 | Donner | |
| 2002/0157312 A1 | 10/2002 | Adler | |
| 2002/0192494 A1* | 12/2002 | Tzatzov et al. | 428/655 |
| 2004/0071618 A1 | 4/2004 | Sprouse | |

(Continued)

FOREIGN PATENT DOCUMENTS

DE  4025916  1/1991

(Continued)

OTHER PUBLICATIONS

International Search Report and Written Opinion dated Jan. 14, 2010.
International Preliminary Report on Patentability mailed Sep. 16, 2010 for PCT/US2009/030394.

(Continued)

*Primary Examiner* — Walter D Griffin
*Assistant Examiner* — Natasha Young
(74) *Attorney, Agent, or Firm* — Carlson, Gaskey & Olds PC

(57) ABSTRACT

A reactor vessel liner system includes a liner having a plurality of first conduits and a plurality of second conduits for conveying a coolant. The plurality of second conduits is located at least partially within corresponding ones of the plurality of first conduits.

28 Claims, 2 Drawing Sheets

U.S. PATENT DOCUMENTS

| | | | |
|---|---|---|---|
| 2005/0220684 A1* | 10/2005 | Reinke et al. | 422/198 |
| 2006/0045827 A1 | 3/2006 | Sprouse | |
| 2006/0210457 A1 | 9/2006 | Sprouse | |
| 2006/0242907 A1 | 11/2006 | Sprouse | |
| 2006/0243583 A1 | 11/2006 | Sprouse | |

FOREIGN PATENT DOCUMENTS

| | | |
|---|---|---|
| EP | 0065330 | 11/1982 |
| GB | 2094955 | 9/1982 |
| WO | 2007100441 | 9/2007 |

* cited by examiner

REACTOR VESSEL AND LINER

BACKGROUND OF THE INVENTION

This disclosure relates to a reactor vessel and cooled liner.

Reactor vessels, such as carbonaceous fuel gasifiers for producing synthesis gas, typically operate at elevated temperatures. For example, the temperature in a carbonaceous fuel gasifier may exceed 3000° F. (1649° C.). The reactor vessel may include an internal liner that protects the reactor vessel from the elevated temperatures, which may be greater than 1200° F. (649° C.) at the liner.

A variety of different types of liners are known. For example, one type of liner includes refractory bricks that insulate the reactor vessel from the high temperatures. However, one drawback of using refractory bricks is that the bricks may become damaged in a relatively short period of time and require replacement, which increases the operating expense of the reactor vessel. Additionally, reactor vessels that utilize refractory bricks may require relatively long warm-up or cool-down periods to avoid thermal shock damage.

Another type of liner in gasifier reactor vessels is referred to as a membrane wall, comprised of a jacket of tubes coated with a ceramic compound (typically a silicon carbide-based ramming mix) and is cooled with either sub-cooled or boiling water. This cooled membrane wall liner approach provides a frozen slag layer to protect the liner, purportedly resulting in relatively long liner life. However, this liner approach is complex and significantly higher cost than refractory brick lined gasifiers.

A third type of liner is a cooled ceramic matrix composite (CMC) liner, which is comprised either of individual CMC tubes/channels or integrally woven CMC channels. The ceramic panels are joined to the metal reactor vessel or other metal components used with the reactor vessel, such as coolant inlet and return passages. Although effective for cooling and more durable than refractory bricks, a thermal expansion mismatch between the CMC components and the metal of the attached reactor vessel or component may impede the ability to achieve long-lived reactor vessel liner designs.

SUMMARY OF THE INVENTION

The disclosed examples provide a relatively simple reactor vessel system and liner system arrangement for facilitating reduction in thermal stresses, while providing the long life associated with membrane wall liners and the low cost of refractory brick lined reactors.

An example reactor vessel liner system includes a liner having a plurality of first conduits and a plurality of second conduits for conveying a coolant. The plurality of second conduits is located at least partially within corresponding ones of the plurality of first conduits. For example, the plurality of first conduits and the plurality of second conduits line a vessel wall of a reactor vessel system and circulates a coolant to thereby cool the reactor vessel.

An example method for cooling the reactor vessel system includes transporting a coolant through the plurality of first conduits and second conduits of the liner.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
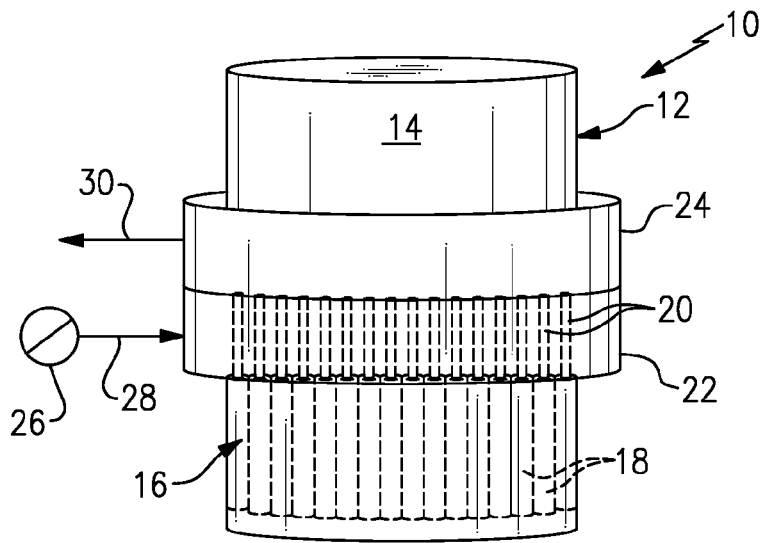
FIG. 1 illustrates an example reactor vessel system.

FIG. 1 illustrates selected portions of an example reactor vessel system 10, such as a carbonaceous fuel gasifier for producing synthesis gas. It is to be understood that the example reactor vessel system 10 as shown may include additional components, such as those related to feeding carbonaceous fuel and reaction gas. The reactor vessel system 10 includes a reactor vessel 12 having a gasifier injector 13 (FIG. 4) contained in a vessel wall 14. For example, the reactor vessel 12 may be used to contain reactions that produce temperatures exceeding 3000° F. (1649° C.) and temperatures of 1200° F. (649° C.) or higher near the internal surface of the vessel wall 14. In this regard, the reactor vessel system 10 includes a liner 16 for protecting the vessel wall 14 from the elevated temperatures within the reactor vessel 12.

As will be described, the liner 16 provides a relatively simple assembly for maintaining a desired temperature at the vessel wall 14 of the reactor vessel 12 and facilitates reduction of thermal stress between the liner 16 and other components of the reactor vessel system 10. As can be appreciated, the liner 16 according to this disclosure is exemplary and, given this description, variations and modifications may become apparent to those skilled in the art.

The liner 16 includes a plurality of first conduits 18 and a plurality of second conduits 20 that cooperatively convey a coolant, such as water or a water mixture, through the liner 16 to control the temperature.

An inlet manifold 22 and an outlet manifold 24 extend around the perimeter of the reactor vessel system 10. The inlet manifold delivers the coolant to the liner 16 and the outlet manifold 24 collects the coolant from the liner 16. For example, a pump 26 may be used to convey the coolant through a supply line 28 to the inlet manifold 22 and circulate the coolant through the conduits 18 and 20. The coolant discharges from the outlet manifold 24 to an outlet line 30 and may subsequently be cooled and recirculated through the liner 16, or may be used as a reactant input into the reactor vessel 12, for example.

Figure 2:
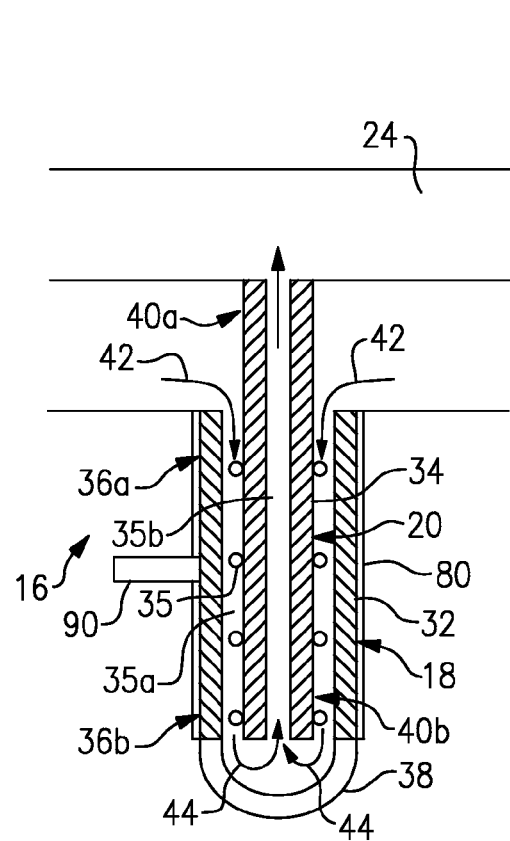
FIG. 2 illustrates an example arrangement of a first conduit and a second conduit.

FIG. 2 illustrates an example arrangement of one of the first conduits 18 and a corresponding one of the second conduits 20. As can be appreciated, other first conduits 18 and second conduits 20 may be arranged likewise. The first conduit 18 comprises an outer tube 32, and the second conduit 20 comprises an inner tube 34 that extends internally within the outer tube 32. An annular passage 35a extends between the outer tube 32 and the inner tube 34, and an internal passage 35b extends through the inner tube 34. Although the tubes 32 and 34 of the illustrated example are coaxial, the tubes 32 and 34 may be axially offset in other examples. Additionally, the tubes 32 and 34 may be non-circular, depending on the needs of a particular application. To promote coolant efficacy, and to maintain appropriate alignment of the inner tube within the center tube, a centering device can be used. An example is shown in FIG. 2, where a wire 35 is helically wound around each inner tube 34 to serve as a spacer between the inner tube 34 and outer tube 32.

The outer tube 32 includes a first end section 36a and a second end section 36b. The first end section 36a is open and in fluid communication with the inlet manifold 22 such that the inlet manifold 22 supplies coolant in parallel to each outer tube 32. Supplying the coolant in parallel facilitates uniform cooling of the liner 16. The second end section 36b includes an end cap 38 that closes off the end section 36b. The end cap 38 may be integrally formed with the outer tube 32, or a separate piece that is fixed to the end section 36b.

The inner tube 34 includes a first end section 40a that opens to the outlet manifold 24 and a second end section 40b that is also open. Coolant flows through the annular passage 35a of the outer tube 32 from the inlet manifold 22 toward the end section 36b, as represented by arrows 42. The end cap 38 turns the flow of the coolant, as represented by arrows 44, into the internal passage 35b of the end section 40b of the inner tube 34. The coolant flows up through the inner tube 34 into the outlet manifold 24.

As the coolant flows through the annular passage 35a between the outer tube 32 and the inner tube 34, the coolant absorbs heat from the reactor vessel 12 to maintain a desired temperature at the vessel wall 14, and to maintain the first conduits 18 at temperatures conducive to long life. The annular passage 35a facilitates efficient heat absorption by providing a relatively high coolant velocity for a given coolant flow rate. Thus, the efficiency is limited by coolant velocity, not thermal absorption, and the flow rate requirements can be reduced compared to prior, open flow liners.

As can be appreciated, the pump 26 may be used to control a flow rate of the coolant to thereby control the degree of cooling provided to the liner 16. Additionally, the diameters and lengths of the tubes 32 and 34 and passages 35a and 35b may be selected at a design stage to provide a desired flow rate and corresponding degree of cooling. For example, the tubes 32 and 34 are approximately 3 ft.-15 ft. (0.9 m-4.6 m) in length. Furthermore, the coolant temperature can be selected at an optimal level for heat integration into the surrounding processes, subject to constraints imposed by the mechanical properties of the first conduit 18 and avoidance of boil-out at a given heat flux into the first conduit 18 from the gasifier.

Although a particular arrangement of the reactor vessel system 10 is shown with regard to the direction of the flow of coolant, it is to be understood that the examples herein are not limited to any particular flow direction. Thus, the coolant alternatively could be supplied with an opposite flow direction. However, in one example, supplying the coolant as shown in FIG. 2 facilitates temperature control by first exposing coolant from the inlet manifold 22 to the highest temperature portion of the liner 16 that is directly exposed to the elevated temperatures within the reactor vessel 12 (i.e., the outer tubes 32) before the coolant absorbs heat from other portions of the liner 16 that are not directly exposed (i.e., the inner tubes 34).

Figure 3:
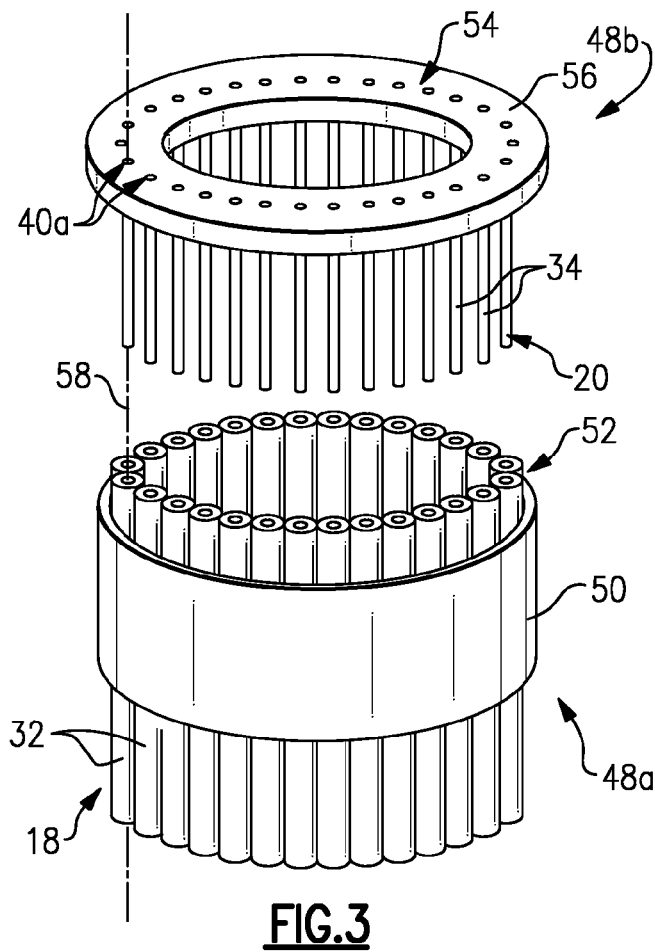
FIG. 3 illustrates example first conduits and second conduits assembled into respective modules.

Referring to FIG. 3, the outer tubes 32 and the inner tubes 34 may be assembled into respective modules 48a and 48b that facilitate assembly into the reactor vessel system 10. For example, a support member 50 may be used to arrange the outer tubes 32 into a ring formation 52. The support member 50 may be a structural jacket, strap, annular plate, or the like that is welded, brazed, or otherwise bonded to at least some of the outer tubes 32. The support member 50 also facilitates prevention of bowing of the outer tubes 32 during operation of the reactor vessel system 10. Each of the outer tubes 32 contacts a neighboring outer tube 32 on each side to limit gas flow between the outer tubes 32. As will be discussed more below, the support member 50 may be made from the same material as the outer tubes 32.

The inner tubes 34 are also arranged into a ring formation 54 using another support member 56. In this example, the support member 56 is an annular plate that is fixed with the ends 40a of the inner tubes 34. As can be appreciated, the ends 40a of the inner tubes 34 need not be flush with the top surface of the support member 56 and may extend above the top surface, depending upon the needs of a particular application.

The modules 48a and 48b facilitate assembly into the reactor vessel system 10 by enabling alignment of the tubes 32 and 34 in a desired orientation and providing fewer pieces to assemble. For example, the tubes 32 and 34 are oriented in the modules 48a and 48b such that their lengthwise directions 58 are approximately parallel. The modules 48a and 48b may then be located into the reactor vessel 12 such that the inner tubes 34 extend within corresponding ones of the outer tubes 32. It is to be understood that the disclosed arrangement is not limited to assembling the tubes 32 and 34 as modules and that other arrangements and assembly methods may be used.

Figure 4:
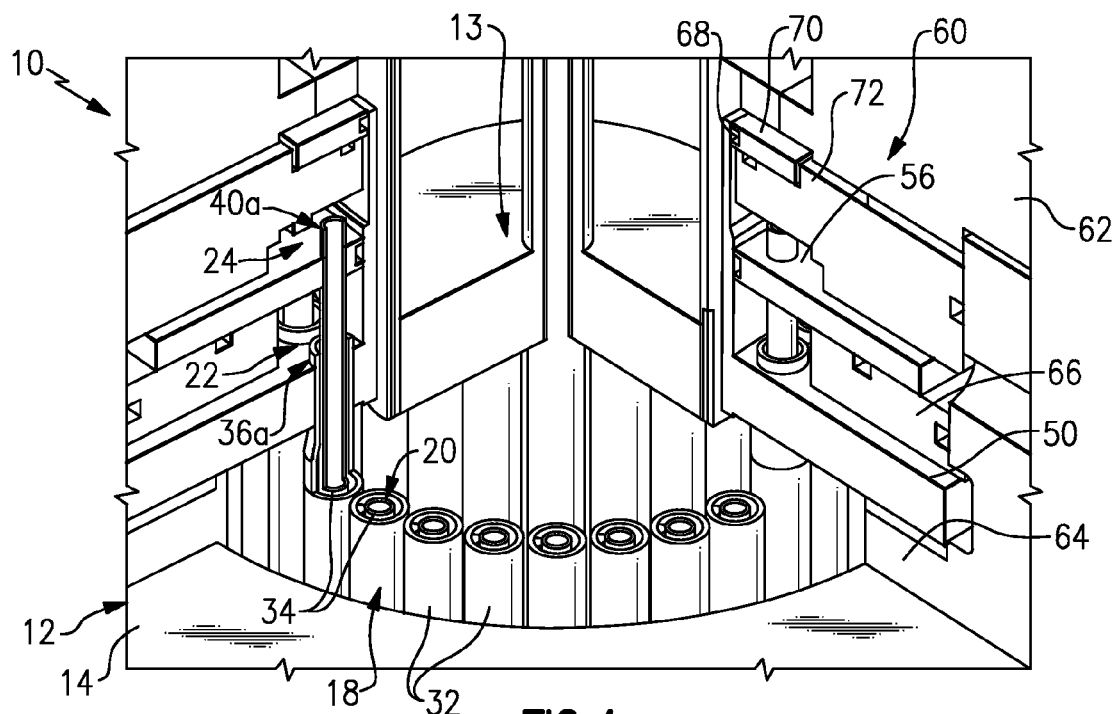
FIG. 4 illustrates a cutaway view of the example reactor vessel system.

Referring to FIG. 4, the outer tubes 32 and the inner tubes 34 are secured within the reactor vessel 12. In this example, the support members 50 and 56 are used to secure the tubes 32 and 34. However, it is to be understood that other methods of supporting and securing the tubes 32 and 34 may be used and the arrangement of the tubes 32 and 34 is not limited to the disclosed attachment method. For example, the tubes 32 and 34 are secured in the reactor vessel 12 using a clamp system 60. The clamp system 60 includes a first clamp member 62 and a second clamp member 64 that clamp the support members 50 and 56 and also forms a portion of the inlet manifold 22 and the outlet manifold 24. In this example, the support member 50 is secured within the clamp system 60. However, in other examples, the support member 50 may instead be fixed to the vessel wall 14, such as by welding or brazing.

A spacer 66 may be used between the support members 50 and 56 to prevent collapse and to form a portion of the inlet manifold 22. Additionally, a seal 68 and seal carrier 70 may be used at a top wall 72 of the outlet manifold 24 to facilitate a leak-free connection.

The liner 16 facilitates eliminating or reducing thermal stress. The first end sections 36a of the outer tubes 32 are secured to the reactor vessel 14 via the support member 50, and the first end sections 40a of the inner tubes 34 are secured to the reactor vessel 14 via the support member 56. The second ends sections 36b and 40b of the respective tubes 32 and 34 are free such that any thermal growth of the tubes 32 and 34 is unrestricted to thereby avoid causing thermal stress. Thus, any thermal stress is limited to the portions of the liner 16 that are clamped in the clamp system 60.

In the illustrated example, the outer tubes 32, the inner tubes 34, or both, may be formed from a relatively corrosion resistant metal material. For example, the metal material may include a cobalt alloy. In other examples, the outer tubes 32 may be formed of a ceramic matrix composite. For example, the ceramic matrix composite may include silicon carbide, or other type of ceramic matrix material.

Optionally, at least the outer tubes 32 may also include a coating 80 (FIG. 2) to protect the outer tubes 32 from erosion and corrosion, and/or to facilitate formation of a slag layer on the outer tubes 32. Although a layer of slag may form on the outer tubes 32, the coating 80 refers to a pre-deposited layer on the outer tubes 32, not the slag. For example, the coating 80 may include a metal alloy. In a further example, the coating 80 may include MCrAlY, where the M includes at least one of nickel, cobalt, iron, or a combination thereof, Cr is chromium, Al is aluminum, and Y is yttrium. In a further example, the coating 80 may be STELLITE®, mullite, silicon carbide, yttrium silicate, or combinations thereof. Additionally, the coating 80 may be a composite of one or more coating layers of different coating materials. The coating 80 may be deposited onto the outer tubes 32 using any suitable process for the type of coating material that is selected, such as thermal spraying or slip casting. Additionally, the coating 80 may include a ramming compound (i.e., refractory material) that is applied over the outer tubes 32, with or without anchoring devices such as the projections 90 or other protuberances, to facilitate formation of protective slag layers at the outer surface of outer tubes 32. Given this description, one of ordinary skill in the art will recognize suitable deposition processes to meet their particular needs.

At least some of the outer tubes 32 may also include projections 90 (FIG. 2) or similar protuberances (such as studs, fins, threads, or other anchoring devices) that extend outwards from the outer surfaces of the outer tubes 32. For example, the projections 90 function as anchoring devices for slag to adhere to the outer tubes 32. The slag may form an additional protective layer over the outer tubes 32.

Figure 5:
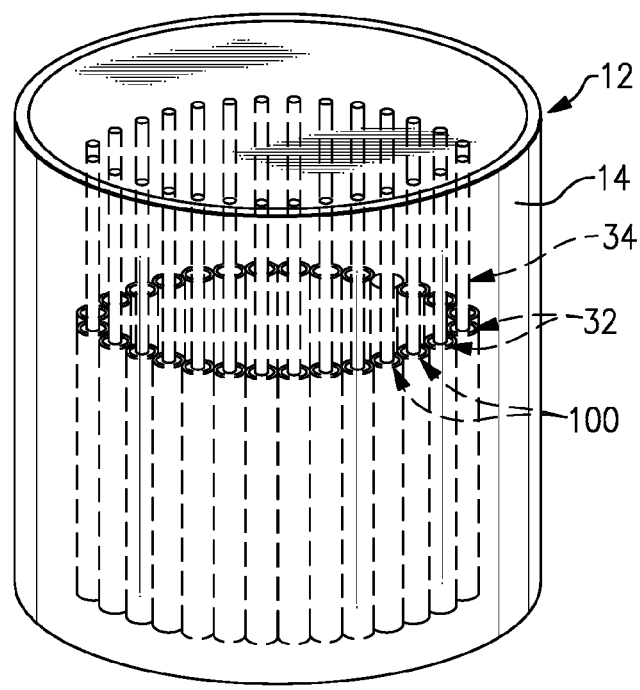
FIG. 5 illustrates an example ceramic sheath placed about each individual first conduit tube.

Referring to FIG. 5, a ceramic sheath 100 may additionally be used around each outer tube 32. For example, the ceramic sheath 100 may be formed of a monolithic ceramic or ceramic matrix composite that is slip-fit over the outer tubes 32 or brazed to the outer tubes 32. The ceramic sheath 100 further limits gas flow to the vessel wall 14, which may otherwise result in corrosion or erosion of the vessel wall 14.

Terms of approximation such as "about" or "approximately" that may be used in this description relative to geometries, distances, temperatures, locations, or the like refer to possible variation in a given value, such as normally accepted variations or tolerances in the art.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can be determined by studying the following claims.

What is claimed is:

1. A reactor vessel liner system comprising:
a liner having a plurality of first conduits and a plurality of second conduits operable to convey a coolant, wherein the plurality of second conduits is located at least partially within corresponding ones of the plurality of first conduits.

2. The reactor vessel liner system as recited in claim 1, wherein the plurality of first conduits comprises outer tubes and the plurality of second conduits comprises inner tubes that extend at least partially within corresponding ones of the outer tubes.

3. The reactor vessel liner system as recited in claim 2, wherein the outer tubes each include an annular passage between the outer tube and the corresponding inner tube, and each of the inner tubes includes an internal passage.

4. The reactor vessel liner system as recited in claim 1, wherein the plurality of first conduits, the plurality of second conduits, or both comprise a metal.

5. The reactor vessel liner system as recited in claim 4, wherein the metal comprises a cobalt alloy.

6. The reactor vessel liner system as recited in claim 1, wherein the plurality of first conduits, the plurality of second conduits, or both comprise a ceramic matrix composite.

7. The reactor vessel liner system as recited in claim 6, wherein the ceramic matrix composite comprises silicon carbide.

8. The reactor vessel liner system as recited in claim 1, wherein the plurality of first conduits comprise a non-slag coating.

9. The reactor vessel liner system as recited in claim 8, wherein the coating comprises at least one of a metal alloy or a ceramic material.

10. The reactor vessel liner system as recited in claim 9, wherein the coating is the ceramic material, and the ceramic material comprises a ramming compound.

11. The reactor vessel liner system as recited in claim 1, wherein at least a portion of the plurality of first conduits comprise projections extending therefrom.

12. The reactor vessel liner system as recited in claim 1, further comprising a ceramic sheath that extends at least partially around the plurality of first conduits.

13. The reactor vessel liner system as recited in claim 1, wherein the plurality of first conduits comprises first hollow tubes and the plurality of second conduits comprises second hollow tubes that are within corresponding ones of the first hollow tubes.

14. The reactor vessel liner system as recited in claim 1, wherein the plurality of first conduits comprises first hollow tubes and the plurality of second conduits comprises second hollow tubes, and each second hollow tube is at least partially within a corresponding one of the first hollow tubes and is coaxial with that corresponding first hollow tube.

15. The reactor vessel liner system as recited in claim 1, wherein the plurality of first conduits comprises outer hollow tubes and the plurality of second conduits comprises inner hollow tubes.

16. The reactor vessel liner system as recited in claim 1, wherein the plurality of first conduits comprises first hollow tubes and the plurality of second conduits comprises second hollow tubes, and each second hollow tube is within a corresponding one of the first hollow tubes such that there are annular open passages between the second hollow tubes and the corresponding first hollow tubes.

17. A reactor vessel liner system comprising:
a liner having a plurality of first conduits and a plurality of second conduits for conveying a coolant, wherein the plurality of second conduits is located at least partially within corresponding ones of the plurality of first conduits, the plurality of first conduits comprises outer tubes and the plurality of second conduits comprises inner tubes that extend at least partially within corresponding ones of the outer tubes, the outer tubes each include an annular passage between the outer tube and the corresponding inner tube, and each of the inner tubes includes an internal passage, and wherein the annular passage of each outer tube is fluidly connected with the internal passage of the corresponding inner tube.

18. A reactor vessel liner system comprising:
a liner having a plurality of first conduits and a plurality of second conduits for conveying a coolant, wherein the plurality of second conduits is located at least partially within corresponding ones of the plurality of first conduits, wherein the plurality of first conduits comprises outer tubes and the plurality of second conduits comprises inner tubes that extend at least partially within corresponding ones of the outer tubes, and wherein each of the outer tubes includes an end cap.

19. The reactor vessel liner system as recited in claim 2, wherein the outer tubes are arranged in a ring formation such that lengthwise directions of the outer tubes are approximately parallel.

20. The reactor vessel liner system as recited in claim 19, further including a support member extending circumferentially around the ring formation and bonded to at least a portion of the outer tubes.

21. A reactor vessel liner system comprising:
a liner having a plurality of first conduits and a plurality of second conduits for conveying a coolant, wherein the plurality of second conduits is located at least partially within corresponding ones of the plurality of first conduits, wherein the plurality of first conduits comprises outer tubes and the plurality of second conduits comprises inner tubes that extend at least partially within corresponding ones of the outer tubes; and
centering devices between the plurality of first conduits and the plurality of second conduits for maintaining a desired alignment of the plurality of second conduits within the plurality of first conduits.

22. A reactor vessel system comprising:
a reactor vessel including a vessel wall; and
a liner that lines the vessel wall, the liner having a plurality of first conduits and a plurality of second conduits operable to convey a coolant, wherein the plurality of first conduits is located at least partially within corresponding ones of the plurality of first conduits.

23. A reactor vessel system comprising:
a reactor vessel including a vessel wall;
a liner that lines the vessel wall, the liner having a plurality of first conduits and a plurality of second conduits for conveying a coolant, wherein the plurality of first conduits is located at least partially within corresponding ones of the plurality of first conduits; and
an inlet manifold and an outlet manifold fluidly connected with the plurality of first conduits and the plurality of second conduits.

24. The reactor vessel system as recited in claim 23, wherein the inlet manifold is connected in parallel with the plurality of first conduits and the outlet manifold is connected in parallel with the plurality of second conduits.

25. The reactor vessel system as recited in claim 23, wherein the inlet manifold and the outlet manifold extend entirely about a perimeter of the reactor vessel.

26. A reactor vessel system comprising:
a reactor vessel including a vessel wall; and
a liner that lines the vessel wall, the liner having a plurality of first conduits and a plurality of second conduits for conveying a coolant, wherein the plurality of first conduits is located at least partially within corresponding ones of the plurality of first conduits, and wherein each of the plurality of first conduits and the plurality of second conduits includes a first end that is fixed with the reactor vessel and a free, second end.

27. A method for cooling a liner of a reactor vessel system, the method comprising:
transporting a coolant through a plurality of first conduits of the liner to cool the liner; and
transporting the coolant through a plurality of second conduits of the liner, wherein the plurality of second conduits is located at least partially within corresponding ones of the plurality of first conduits.

28. The method as recited in claim 27, including supplying the coolant in parallel to the plurality of first conduits.

* * * * *